United States Patent Office 2,933,483
Patented Apr. 19, 1960

2,933,483

OLEFIN POLYMERIZATION CATALYST CONTAINING A METAL HALIDE AND HEXAPHENYL-ETHANE

Harry W. Coover, Jr., Kingsport, Tenn., assignor to Eastman Kodak Company, Rochester, N.Y., a corporation of New Jersey No Drawing. Application September 30, 1958
Serial No. 764,228

11 Claims. (Cl. 260—93.7)

This invention relates to the catalytic polymerization of α-monoolefins to high molecular weight, highly crystalline solid polymers. In a specific aspect this invention relates to the polymerization of ethylene, propylene or mixtures thereof to form solid high density polymers.

For many years, the Friedel-Crafts type catalysts, such as aluminum chloride and boron trifluoride, were used to polymerize olefins to form low molecular weight, liquid polymers. Until recently, the commercial production of solid polyethylene was limited to the extremely high pressure process disclosed by Fawcett et al. in U.S. 2,153,553 wherein it was disclosed that ethylene could be polymerized to a solid waxy polymer by the use of pressures in excess of 500 atmospheres and usually of the order of 1000–2000 atmospheres. This high pressure polyethylene was characterized by a high degree of flexibility, good film-forming properties and a waxy feel. Since such high pressure polyethylene possesses a rather high degree of chain branching, however, it also exhibits a relatively low softening temperature, a low density, and relatively low crystallinity.

In recent years it was discovered that solid polymers could be prepared by polymerizing ethylene in the presence of a catalytic mixture consisting of a supported oxide of chromium, molybdenum, tungsten or uranium activated by an alkali metal, and at about the same time, it was discovered that metal alkyls could be used to form low molecular weight polymers with ethylene or similar olefins. Thereafter, it was found that the metal alkyls or metal alkyl halides such as aluminum triethyl or ethyl aluminum chloride in combination with a compound of a metal from the 4th to the 6th subgroups of the periodic table gave high molecular weight solid polymers which were characterized, as were the polymers prepared with a metal oxide catalyst, by a high density, high crystallinity, improved melting point, and relatively greater rigidity than is characteristic of the high pressure polymers.

The catalysts, such as the metal oxides and the compositions containing the metal alkyls or metal alkyl halides, have been found to be quite effective for producing high density highly crystalline polyethylene. These catalysts are generally regarded as being of the non-ionic type, but they are known to suffer from certain disadvantages. For example, the metal oxide catalysts are usually used on solid supports as a catalyst bed and these catalyst compositions are subject to plugging of the catalyst bed and coating with consequent inactivation of the catalyst unless special precautions are taken to insure solution of the polymer as it is formed. The metal alkyls and metal alkyl halides are expensive to prepare and they are difficult to handle in commercial practice due to the fact that they ignite spontaneously on contact with air. In the past a different type of catalyst has usually been employed to prepare low density polyethylene having a relatively low crystallinity. Among the numerous catalysts suggested for preparing this type of polyethylene are included the peroxide-type of catalysts as well as the catalysts represented by azobisisobutyrylnitrile and the azobisisobutyrate esters. Such catalysts are generally regarded as being of the free radical type and their use is expected to lead to the formation of a low density polyethylene of relatively low crystallinity. For that reason in the past it has generally been felt that the free radical type of catalyst could not be used to form high density, highly crystalline polymers of olefinic hydrocarbons.

It is accordingly an object of this invention to provide a new and improved process for effecting conversion of α-monoolefins, such as ethylene or propylene, or mixtures thereof, to high molecular weight, highly crystalline solid polymers in high yield using a free radical type of catalyst. Another object of the invention is to provide a new and improved process for catalytic polymerization of ethylene and similar α-monoolefins of 2–10 carbon atoms to high density, highly crystalline solid polymers employing simple combinations of catalytic components which are free of the objectionable handling problems characteristic of the pyrophoric catalysts heretofore employed. Another object of the invention is to facilitate the commercial manufacture of high density, highly crystalline ethylene polymers by providing an economical process which can be readily carried out at pressures that approach atmospheric pressure and at temperatures ranging from room temperature or lower to 250° C. in high yields. Another object of the invention is to provide a catalyst mixture which is highly effective for forming solid polyolefins and containing only two components, neither of which is itself of any utility for polymerizing α-monoolefins even to low molecular weight polymers. Other objects will be apparent from the description and claims which follow.

These and other objects are attained by means of this invention wherein it was found unexpectedly that α-monoolefins, either singly or in admixture, could be converted in high yield to high molecular weight, highly crystalline, high density solid polymers by effecting the polymerization in the presence of a catalytic mixture of hexaphenylethane and a halide or oxyhalide of a transition metal selected from the group consisting of titanium, vanadium, chromium, tungsten, molybdenum and zirconium. It has now been found that this combination of two materials which in themselves possess no utility for polymerizing olefins to yield low or high molecular weight liquid or solid polymers, gives results which are comparable to or better than the best catalytic processes known heretofore for making solid polymers of high crystallinity, melting point, and rigidity. Insofar as is known, hexaphenylethane has not been recognized as having any utility in the polymerization of olefins. Furthermore, the transition metal halides and oxyhalides are considered to be substantially ineffective as hydrocarbon polymerization catalysts. The reason why the two-component mixture exhibits the high degree of catalytic activity is not readily understood and could not be predicted from the art wherein it is apparent that the catalytic activity is empirical and unpredictable. The unexpected effectiveness of this catalyst system is demonstrated by the fact that it is of the ionic or free radical type in contrast to the non-ionic type, but it produces highly crystalline, high density polyolefins.

When the two catalyst components of this invention are employed in combination, the apparently synergistic mixture possesses a high degree of activity at temperatures as low as room temperature and at pressures as low as atmospheric pressure. The relative proportions of the two components can be varied quite widely, although best results are obtained when the transition metal compound and hexaphenylethane are employed in a mole ratio within the range of 1 to 6 to 6 to 1.

The invention thus employs, as catalyst components, materials which do not ignite spontaneously on contact with air. This latter is a particular advantage when dealing with large scale operations with the highly flammable gaseous monoolefins. The catalyst mixtures included within the scope of the invention include any of the two-component catalyst mixtures of hexaphenylethane and a halide or oxyhalide of the transition metals. Among the halides and oxyhalides that can be used are $TiCl_4$, $TiCl_3$, $VOCl_2$, $VOCl_3$, $VCl_4$, $VCl_3$, $CrCl_3$, $CrO_2Cl_2$, $CrCl_2$, $CrCl_6$, $WCl_5$, $WCl_4$, $WO_2Cl_2$, $WOCl_4$, $WCl_2$, $ZrCl_4$, $ZrCl_3$, $MoCl_4$, $MoCl_3$, and the like. The transition metal can be at its maximum valence or in a reduced valence form. The chlorides and oxychlorides are preferred, but other halides and oxyhalides can be used. For example, in place of the above chlorides and oxychlorides the corresponding bromides, iodides, oxybromides and oxyiodides can be used.

Hexaphenylethane is known to contain the triphenylmethyl radical in hydrocarbon solutions as a result of the following equilibrium:

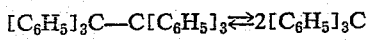

However, the mechanism by which the catalysts of this invention promote the polymerization is not understood, and it is not known that the above equilibrium is a necessary factor in the operation of the catalyst.

The inventive process is carried out in liquid phase in an inert organic liquid, and preferably an inert liquid hydrocarbon vehicle, and the removal of catalyst is facilitated by operating below the melting point of the polymer. The process proceeds with excellent results over a relatively wide temperature range with temperatures from room temperature to 250° C. being preferably employed, and particularly good results being obtained in the range of 50 to 200° C. The pressure can be varied as desired, with pressures that approach atmospheric pressure being operable. Generally speaking, however, it is desirable to employ a pressure in the range of 40 to 5000 p.s.i.g. for optimum yields. In some cases, higher pressures such as are employed in the conventional high pressure processes can be used but are usually not necessary. Thus, pressures of as much as 20,000 p.s.i.g. or higher can be used in some instances. The liquid vehicle employed is desirably one which serves both as a liquid medium and as a solvent for the solid polymerization products at the temperature of polymerization. The great increase in polymerization rate with increasing pressures makes the use of the higher pressures desirable.

The invention is applicable for polymerizing any of the well known α-monoolefinic hydrocarbons and preferably those containing from 2 to 10 carbon atoms. In most cases, the invention is particularly applicable for polymerizing ethylene, propylene or mixtures thereof, although any of the monoolefins can be used or any mixtures of monoolefins depending upon the type of product desired. When ethylene is employed as the monomer, the polyethylene obtained has a softening point or fusion point greater than 130° C. which means that products prepared therefrom can be readily employed in contact with boiling water without deformation or other deleterious results. The polymers embodying this invention have molecular weights greater than 1000 and usually greater than 10,000. The achievement of extremely high molecular weights does not present a problem employing the catalytic process herein described, and molecular weights even greater than 1,000,000 can be readily attained. The high molecular weight, high density polyethylenes of this invention are insoluble in solvents at ordinary temperatures but are soluble in such solvents as xylene, toluene or tetralin at temperatures of about 100° C. With the exception of the compounds of extremely high molecular weight, the polyethylenes obtained according to this invention are soluble in tetralin at 145° C. These solubility characteristics make it possible to carry out the polymerization process under conditions wherein a polymer formed is soluble in the reaction medium during the polymerization and can be precipitated therefrom by lowering the temperature of the resulting mixture.

The polyethylenes of this invention are highly crystalline and usually exhibit crystallinity above 80% as shown by X-ray diagrams. Ordinarily, the crystallinities of the polyethylenes obtained by this process average close to 90%. In contrast to the high pressure polyethylene known heretofore, the number of methyl groups per hundred carbon atoms in the polyethylenes of this invention are of the order of 0.5 or lower. The densities are of the order of 0.945 or higher, with densities of the order of 0.96 or higher being obtained in many cases. The inherent viscosities as measured in tetralin at 145° C. may be varied from about 0.5 or lower to 5.0 or higher. Melt indices as measured by the standard ASTM method may be varied from about 0.01 to 100 or even higher.

Thus, polyethylene prepared by means of this invention and having a molecular weight in the range of 50,000 exhibits a density above 0.95, a softening temperature of at least 130° C., a tensile strength of 3000–5500 p.s.i. and a stiffness in flexure at 5% deflection (ASTM test D747–50) of at least 50,000 p.s.i.

The polyolefins prepared in accordance with the invention can be molded or extruded into flexible plates or films. The products can be extruded to the form of pipe or tubing of greater rigidity than the usual high pressure polyethylene or can be injection molded into a great variety of articles. The polymers can also be cold drawn into ribbons, bands, fibers or filaments of high elasticity and rigidity. Fibers of high strength can be spun from the molten polyethylene obtained according to this process. The polypropylene prepared in the same way also has a very high degree of crystallinity and a very high density, and the polymers of other α-olefins have similarly improved properties. The process of the invention can also be employed to effect the copolymerization of ethylene with other polymerizable α-monoolefins and particularly with propylene. Other monoolefins which are suitably employed either alone or in admixtures include such materials as 1-butene, isobutylene, 1-pentene, 1-decene, 3-methyl-1-butene, 4-methyl-1-pentene, 4,4-dimethyl-1-pentene, allylbenzene, allylcyclohexane, allylcyclopentane, styrene, and similar α-monoolefins. In some cases, it is desirable to prepare copolymers of the α-monoolefins in order to modify the properties for particular uses such as in molding or extrusion applications. Thus, copolymers of 5–95% ethylene with 95–5% propylene are desirably prepared in many cases.

The catalyst mixtures embodying this invention have several important advantages over some of the prior art processes. For example, the rate of polymerization is much faster than is ordinarily achieved with some catalysts known heretofore, and the same degree of polymerization can be achieved in a few hours using the present catalyst system as required several days heretofore. Another advantage of the invention is that relatively lower pressures can be used with pressures as low as atmospheric pressure being operable. Ordinarily, moderate pressures of the order of 40–1000 p.s.i.g. are employed, but the use of such pressures still allows considerable economy over the conventional high pressure processes which operate in the range of 1000–2000 atmospheres in most cases. A further important advantage is the high yield of solid high density, highly crystalline polymer although the catalyst is of the free radical type.

The only limitation on the temperature at which the process can be effected is the decomposition temperature of the catalyst. The pressure employed need be only sufficient to maintain the reaction mixture in liquid form during the polymerization, although moderate pressures are desirable for optimum yield. The exact nature of the catalytic action between the components of the mixture is not wholly understood, and particularly the reason why the mixture has such greatly increased activity is not understood. The catalyst can be separated from the polymer by any of several methods. A convenient method is to wash the product in methanol, dissolve the polymer in a xylene-2-ethylhexanol mixture and reprecipitate the polymer by cooling the solution. The reprecipitated polymer is then filtered, heated with methanolic hydrochloric acid and washed free of acid with methanol. Alternatively, the crude polymer can be washed with methanol, heated with dilute solutions of sodium hydroxide and methanol, and finally washed with methanol and water. Either sequence affords completely colorless polymer.

The polymerization embodying the invention can be carried out batchwise or in a continuous flowing stream process. The continuous processes are preferred for economic reasons, and particularly good results are obtained using a continuous process wherein a polymerization mixture of constant composition is continuously and progressively introduced into the polymerization zone, and the mixture resulting from the polymerization is continuously and progressively withdrawn from the polymerization zone in amounts correlated and equivalent to the rate of introduction, whereby polymers of extremely uniform molecular weight distribution over a relatively narrow range are obtained. Such uniform polymers possess distinct advantages since they do not contain the low molecular weight or high molecular weight fractions which are ordinarily found in polyolefins prepared by batch processes. The ethylene or other $\alpha$-monoolefin can be charged to the polymerization mixture either as a pure material or in admixture with other materials such as hydrogen and hydrocarbons such as methane, ethane or propane. Ordinarily, relatively pure monomers are employed unless copolymers are desired. When the charged mixture consists of two or more olefins, the product consists of a true copolymer of the monomers rather than a mixture of homopolymers.

Although temperatures ranging from room temperature to 250° C. can be employed as desired, the usual process adapted for commercial production is carried out at a temperature in the range of from 50° C. to 200° C. for best results. In the preparation of the uniform polymers by the continuous flowing stream process, the temperature is desirably maintained at a substantially constant value within the preferred range in order to achieve the highest degree of uniformity. Since it is desirable to employ a solution of the monomer of relatively high concentration, the process is desirably effected under a pressure of from 40 to 1000 p.s.i.g. obtained by pressuring the system with the monomer being polymerized. The amount of vehicle employed can be varied over rather wide limits with relation to the monomer and catalyst mixture. Best results are obtained using a concentration of catalyst of from about 0.5 to 5% by weight in the vehicle. The concentration of the monomer in the vehicle will vary rather widely depending upon the reaction conditions and will usually range from about 2 to 50% by weight, or preferably from about 2 to about 10% by weight based on the weight of the vehicle. Concentrations of monomer in the vehicle of about 3–7% by weight are commonly employed. High concentrations of monomer ordinarily increase the rate of polymerization. Concentrations above 5–10% by weight are ordinarily less desirable because the polymer dissolved in the reaction medium results in a very viscous solution. The polymerization time can be varied as desired from a period of a few minutes or hours to several days. When a continuous process is employed, the contact time in the polymerization zone can also be regulated as desired, and in some cases it is not necessary to employ reaction or contact times much beyond one-half to one hour since a cyclic system can be employed involving precipitation of the polymer and return of the vehicle and unused catalyst to the charging zone wherein the catalyst can be replenished and additional monomer introduced.

The organic vehicle employed can be an aliphatic alkane or cycloalkane such as pentane, hexane, heptane or cyclohexane, or a hydrogenated aromatic compound such as tetrahydronaphthalene or decahydronaphthalene, or a high molecular weight liquid paraffin or mixture of paraffins which are liquid at the reaction temperature, or an aromatic hydrocarbon such as benzene, toluene, xylene, or the like, or a halogenated aromatic compound such as chlorobenzene, chloronaphthalene, or orthodichlorobenzene. The nature of the vehicle is subject to considerable variation, although the vehicle employed should be liquid under the conditions of reaction and relatively inert. The hydrocarbon liquids are desirably employed. Other solvents which can be used include ethyl benzene, isopropyl benzene, ethyl toluene, n-propyl benzene, diethyl benzenes, mono and dialkyl naphthalenes, n-octane, isooctane, methyl cyclohexane, and any of the other well known inert liquid hydrocarbons.

The polymerization ordinarily is accomplished by merely admixing the components of the polymerization mixture, and no additional heat is necessary unless it is desired to effect the polymerization at an elevated temperature in order to increase the solubility of polymeric product in the vehicle. When the highly uniform polymers are desired employing the continuous process wherein the relative proportions of the various components are maintained substantially constant, the temperature is desirably controlled within a relatively narrow range. This is readily accomplished since the solvent vehicle forms a high percentage of the polymerization mixture and hence can be heated or cooled to maintain the temperature as desired.

The catalysts embodying the invention can be added to the reaction mixture either separately or jointly, and if desired the catalyst composition can be formed in situ. For example, trityl chloride can be reacted in the absence of air with vanadous chloride to produce a mixture of hexaphenylethane and vanadium trichloride which can be used as a catalyst for the invention. Also, titanium dichloride and chromous chloride can be used in place of vanadous chloride in the reaction with trityl halides to form catalysts for the reaction.

The following examples are illustrative of the invention.

*Example 1*

A mixture of 0.97 g. (0.002 mole) of hexaphenylethane, 0.31 g. (0.002 mole) of titanium trichloride and 100 ml. of anhydrous benzene was placed in a dry 300-ml. rocking autoclave which had been swept with dry, oxygen-free nitrogen. The autoclave is sealed and then purged and pressured to 1000 p.s.i. with ethylene. The autoclave was heated slowly over a 2-hour period to 150° C. and then the pressure was adjusted to 5000 p.s.i. with ethylene. These conditions were maintained for 20 hours before the autoclave was cooled and bled to atmospheric pressure. The product was filtered under a nitrogen atmosphere, washed five times with hot dry methanol, and dried. The yield was 5.1 g. of polyethylene having a density of 0.959 and an inherent viscosity in tetralin at 145° C. of 1.39.

*Example 2*

Example 1 was repeated except that the benzene solvent was omitted and the ethylene was replaced by propylene. In this case, 100 ml. of liquid propylene was added to the autoclave by means of a blowcase. The maximum autogenous pressure recorded was about 750 p.s.i. The yield was 7.5 g. of polypropylene which had a density of 0.903, an inherent viscosity in tetralin at 145° C. of 1.80, and a softening point above 150° C. Upon extraction of this polypropylene with hot isopropyl acetate about 13% by weight of rubbery polypropylene was removed. The remaining highly crystalline polypropylene has a density of 0.918 and a softening point above 160° C. Titanium tribromide and vanadium trichloride also gave effective catalysts when used in place of the titanium trichloride.

*Example 3*

A mixture of 2.9 (0.006 mole) grams of hexaphenylethane, 0.19 (0.001 mole) grams of titanium tetrachloride and 100 ml. of 3-methyl-1-butene was placed in a 300-ml. rocking autoclave which had been thoroughly flushed with dry, oxygen-free nitrogen. The autoclave was sealed and heated to 200° C. over a 4-hour period. The maximum pressure reached was 800 to 1000 p.s.i. The autoclave was maintained at 200° C. for an additional 8 hours. It was then cooled to room temperature and opened. A good yield of crystalline poly-3-methyl-1-butene having a softening point above 200° C. was obtained. Equally good results were obtained by replacing the titanium tetrachloride with chromic chloride or tungsten tetrachloride.

*Example 4*

A 300-ml. autoclave was charged with 0.24 g. (0.005 mole) of hexaphenylethane, 0.57 g. (0.003 mole) of titanium tetrachloride and 100 ml. of dry heptane. A dry, oxygen-free nitrogen atmosphere was maintained and 50 ml. of 4-methyl-1-pentene was added. The autoclave was closed and heated to 50° C. and maintained at this temperature for 12 hours. A pressure of 30 to 40 p.s.i. was developed. A good yield of crystalline poly-4-methyl-1-pentene having a softening point above 210° C. was obtained. Similar results were obtained by replacing the titanium tetrachloride with vanadium tetrachloride or chromyl chloride.

In the above examples equally desirable results can be obtained by polymerizing other monomers, for example, 1-butene, 1-pentene, 1-hexene, 1-decene or similar $\alpha$-monoolefins. Particularly good results are obtained by employing mixtures of ethylene and propylene whereby true copolymers are obtained in which the properties can be varied widely by varying the concentration of the components all the way from the relatively rigid copolymers containing ethylene predominantly to the relatively rubbery copolymers wherein propylene is the predominant component. The lack of chain branching characteristic of the polymers obtained in accordance with this invention indicates that the polymerization mechanism varies significantly from the mechanism wherein either liquid or waxy polymers are formed.

The polymers thus obtained can be extruded, mechanically milled, cast or molded as desired. The polymers are sometimes particularly valuable as blending agents with the relatively more flexible high pressure polyethylenes to give any desired combination of properties. The polymers can also be blended with antioxidants, stabilizers, plasticizers, fillers, pigments and the like or mixed with other polymeric materials, waxes and the like. In general, aside from the relatively higher values for properties such as softening point, density, stiffness and the like, the polymers embodying this invention can be treated in similar manner to those obtained by other processes.

Although the invention has been described in considerable detail with reference to certain preferred embodiments thereof, variations and modifications can be effected within the spirit and scope of the invention as described hereinabove and as defined in the appended claims.

*Example 5*

A mixture of 0.97 g. (0.002 mole) of hexaphenylethane, 0.23 g. (0.001 mole) of zirconium tetrachloride and 100 ml. of anhydrous benzene was placed in a dry 300-ml. rocking autoclave which had been purged with dry, oxygen-free nitrogen. The autoclave was sealed and then purged and pressured to 300 p.s.i. with ethylene. The autoclave was heated slowly over a 4-hour period to 250° C. and then the pressure was adjusted to 1000 p.s.i. with ethylene. These conditions were maintained for 16 hours before the autoclave was cooled and bled to atmospheric pressure. The product was washed with hot dry methanol and dried. The yield was 4.8 g. of polyethylene having a density of 0.951 and an inherent viscosity in tetralin at 145° C. of 1.21.

*Example 6*

A mixture of 2.9 g. (0.006 mole) of hexaphenylethane, 0.24 g. (0.001 mole) of molybdenum tetrachloride and 100 ml. of 3-methyl-1-hexene was placed in a dry 300-ml. rocking autoclave which had been purged with dry, oxygen-free nitrogen. The autoclave was sealed and heated to 80° C. at which temperature it was maintained for 24 hours. A good yield of poly(3-methyl-1-hexene) was obtained. Molybdenum trichloride and molybdenum pentachloride gave similar results when used in place of the molybdenum tetrachloride.

I claim:

1. The method of polymerizing ethylene to highly crystalline solid polymer which comprises contacting ethylene with a catalytic mixture of hexaphenylethane and titanium trichloride in a mole ratio within the range of 1:6 to 6:1 in an inert organic liquid vehicle at a temperature of 50–200° C. and a pressure of 40–5000 p.s.i.g.

2. The method of polymerizing propylene to highly crystalline solid polymer which comprises contacting propylene with a catalytic mixture of hexaphenylethane and titanium trichloride in a mole ratio within the range of 1:6 to 6:1 in an inert organic liquid vehicle at a temperature of 50–200° C. and a pressure of 40–5000 p.s.i.g.

3. The method of polymerizing ethylene to highly crystalline solid polymer which comprises contacting ethylene with a catalytic mixture of hexaphenylethane and titanium trichloride in a mole ratio of 1:6 to 6:1 and in an inert organic liquid vehicle at a temperature of 50–200° C. and a pressure of 40–5000 p.s.i.g.

4. A catalyst for polymerizing $\alpha$-monoolefinic hydrocarbons containing 2–10 carbon atoms to solid polymer consisting essentially of hexaphenylethane and titanium tetrachloride in a mole ratio of 1:6 to 6:1.

5. A catalyst for polymerizing $\alpha$-monoolefinic hydrocarbons containing 2–10 carbon atoms to solid polymer consisting essentially of hexaphenylethane and titanium trichloride in a mole ratio of 1:6 to 6:1.

6. In the polymerization of an $\alpha$-monoolefinic hydrocarbon containing 2–10 carbon atoms to form solid polymer, the improvement which comprises effecting the polymerization in an inert organic liquid vehicle in the presence of a catalytic mixture of hexaphenylethane and a compound selected from the group consisting of the halides and oxyhalides of a transition metal selected from the group consisting of titanium, vanadium, chromium, tungsten, molybdenum and zirconium in a mole ratio within the range of 1:6 to 6:1 at a pressure within the range of 40– 20,000 p.s.i.g.

7. In the polymerization of an $\alpha$-monoolefinic hydrocarbon containing 2–10 carbon atoms to form solid polymer, the improvement which comprises effecting the polymerization in an inert organic liquid vehicle at a temperature of 50–200° C., and a pressure of 40–5000 p.s.i.g. and in the presence of a catalytic mixture of hexaphenylethane and titanium tetrachloride in a mole ratio of 1:6 to 6:1.

8. In the polymerization of an $\alpha$-monoolefinic hydrocarbon containing 2–10 carbon atoms to form solid polymer, the improvement which comprises effecting the polymerization in an inert organic liquid vehicle at a temperature of 50–200° C. and a pressure of 40–5000 p.s.i.g. and in the presence of a catalytic mixture of hexaphenylethane and titanium trichloride in a mole ratio of 1:6 to 6:1.

9. A catalyst for polymerizing $\alpha$-monoolefinic hydrocarbons containing 2–10 carbon atoms to solid polymer consisting essentially of hexaphenylethane and a compound selected from the group consisting of the halides and oxyhalides of a transition metal selected from the group consisting of titanium, vanadium, chromium, tungsten, molybdenum and zirconium in a mole ratio of 1:6 to 6:1.

10. In the polymerization of an α-monoolefinic hydrocarbon containing 2 to 10 carbon atoms to form solid polymer, the improvement which comprises effecting the polymerization in an inert organic liquid vehicle at a temperature within the range of room temperature to 250° C. and a pressure within the range of 40 to 5000 p.s.i.g. and in the presence of a catalytic mixture of hexaphenylethane and a titanium tetrahalide in a mole ratio of 1:6 to 6:1.

11. In the polymerization of an α-monoolefinic hydrocarbon containing 2 to 10 carbon atoms to form solid polymer, the improvement which comprises effecting the polymerization in an inert organic liquid vehicle at a temperature within the range of room temperature to 250° C. and a pressure within the range of 40 to 5000 p.s.i.g. and in the presence of a catalytic mixture of hexaphenylethane and a titanium trihalide in a mole ratio of 1:6 to 6:1.

References Cited in the file of this patent
UNITED STATES PATENTS

| | | |
|---|---|---|
| 2,727,011 | McCaulay et al. | Dec. 13, 1955 |
| 2,867,612 | Pieper et al. | Jan. 6, 1959 |

OTHER REFERENCES

"Chemistry of Organic Compounds," by Noller, W. B. Saunders and Company, Philadelphia, 2nd edition, 1957, pages 566 and 567 pertinent.